No. 808,473. PATENTED DEC. 26, 1905.
J. A. OSBORNE.
APPARATUS FOR MAKING PYROXYLIN COLLARS, CUFFS, AND THE LIKE.
APPLICATION FILED MAY 1, 1905.
7 SHEETS—SHEET 1.
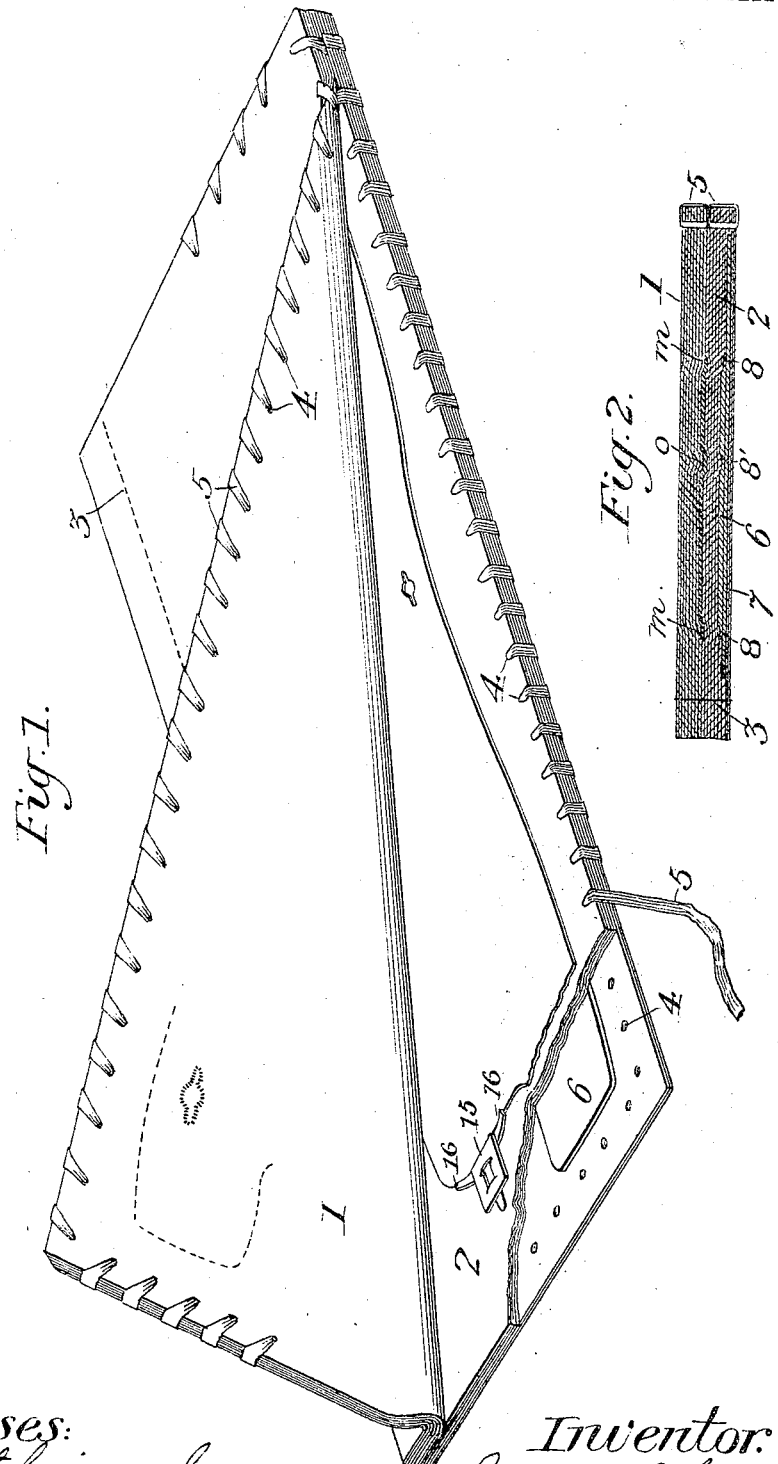

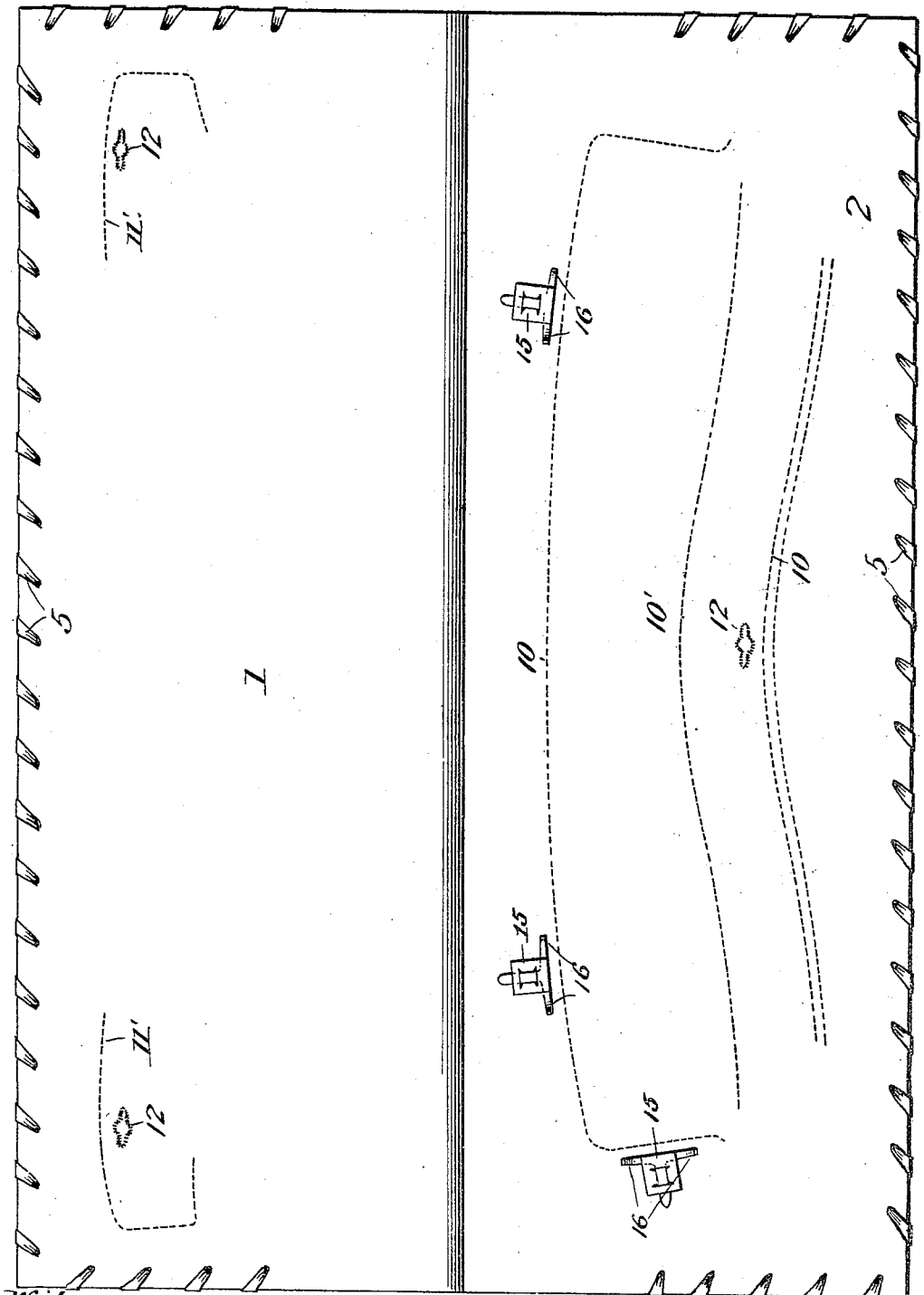

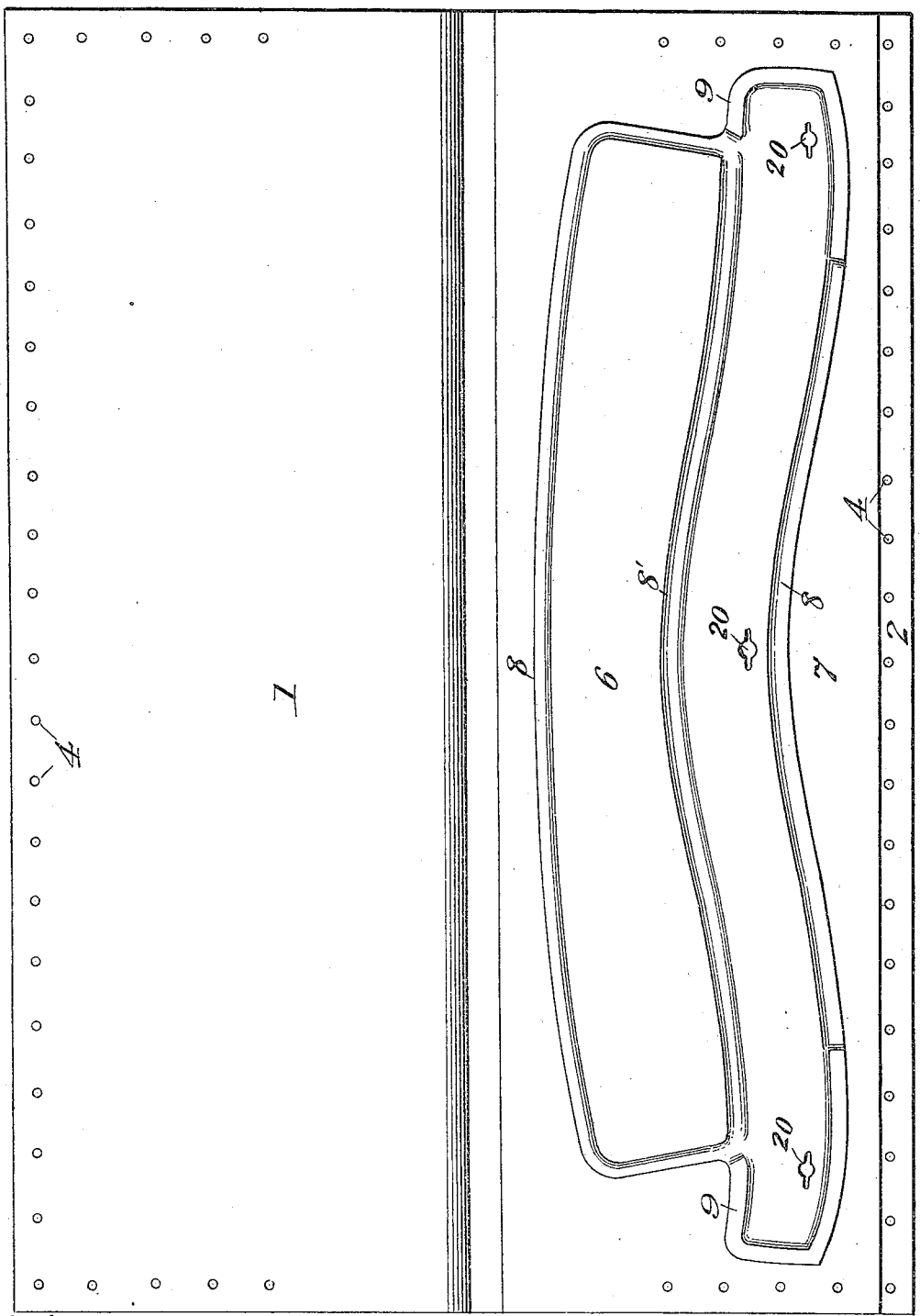

No. 808,473. PATENTED DEC. 26, 1905.
J. A. OSBORNE.
APPARATUS FOR MAKING PYROXYLIN COLLARS, CUFFS, AND THE LIKE.
APPLICATION FILED MAY 1, 1905.
7 SHEETS—SHEET 4.
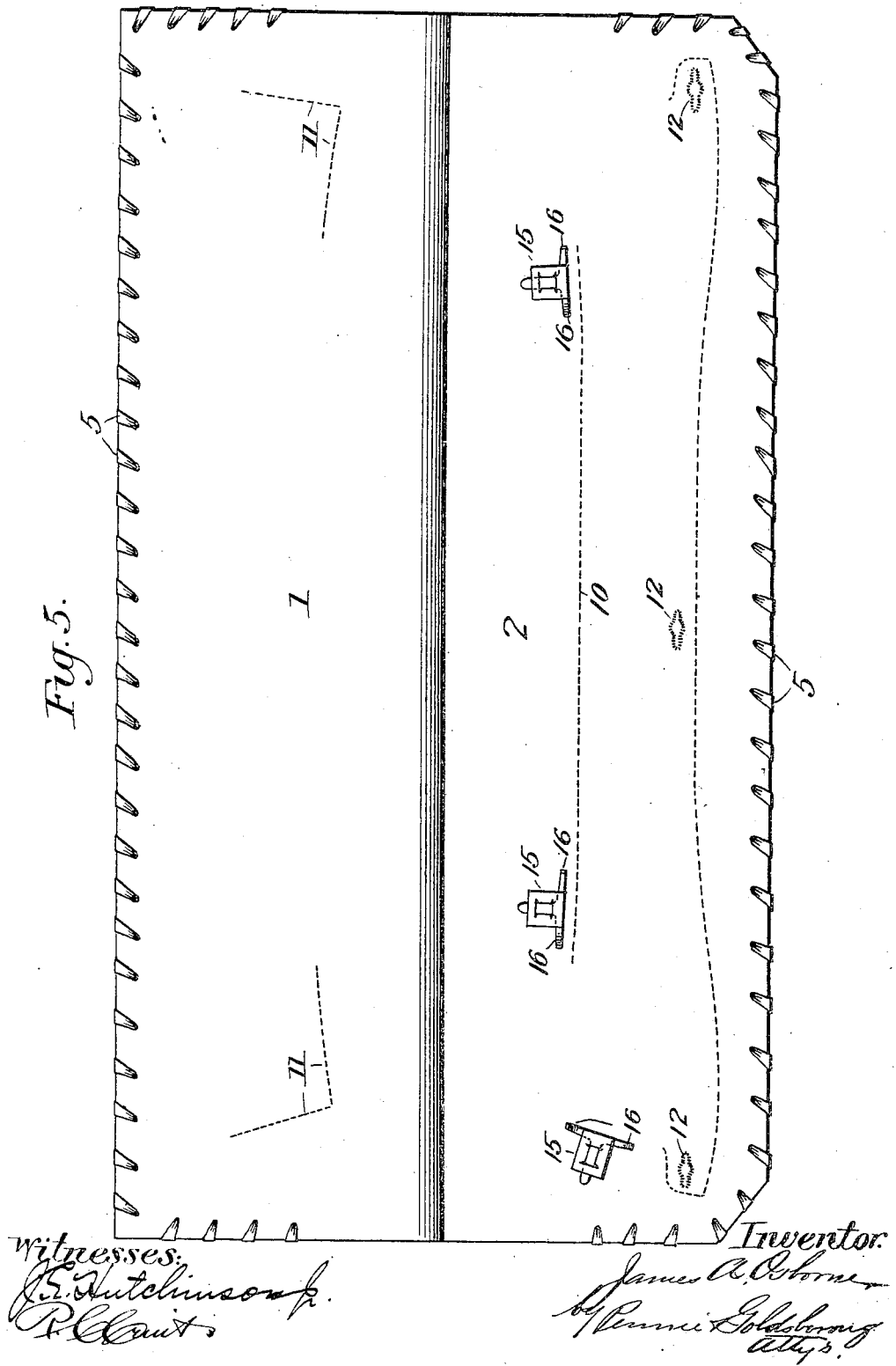

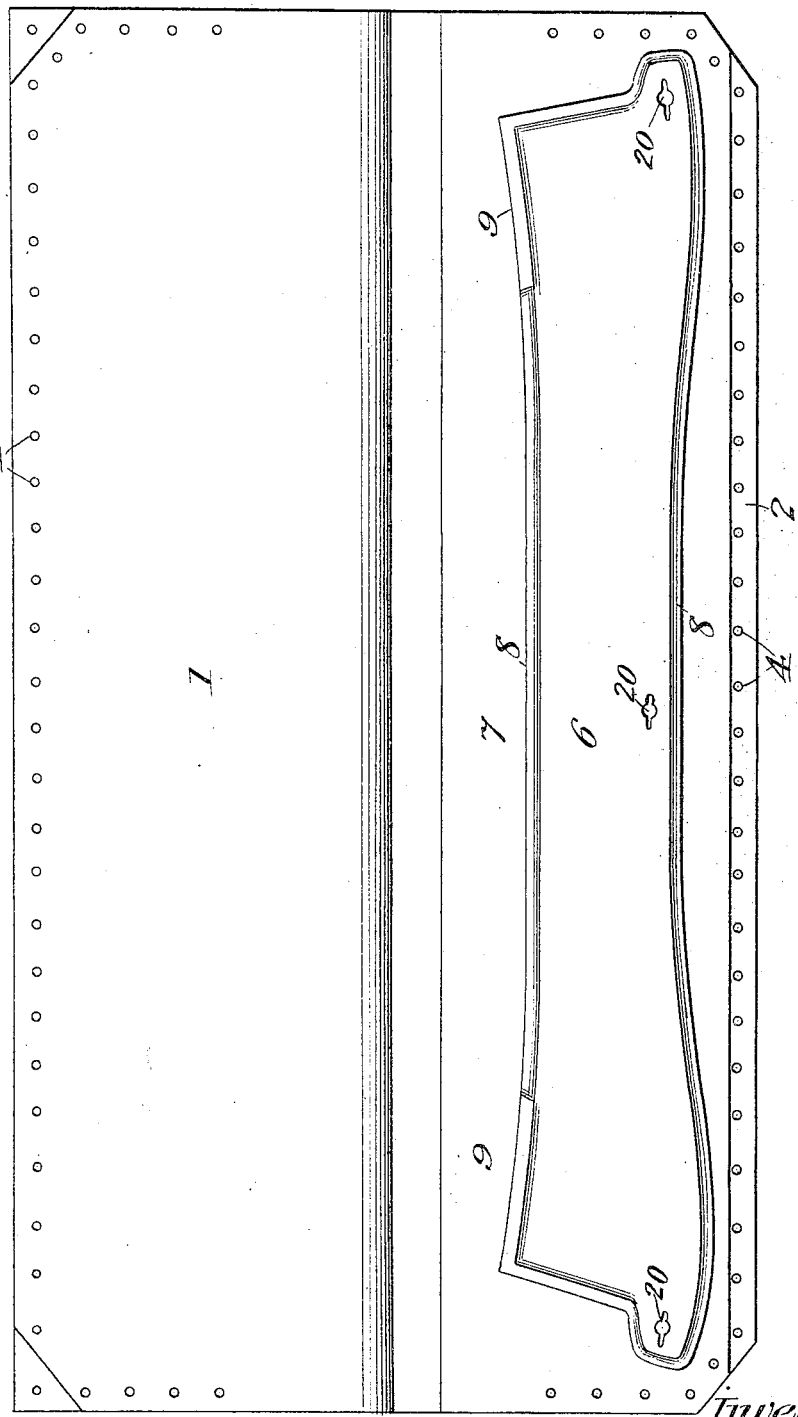

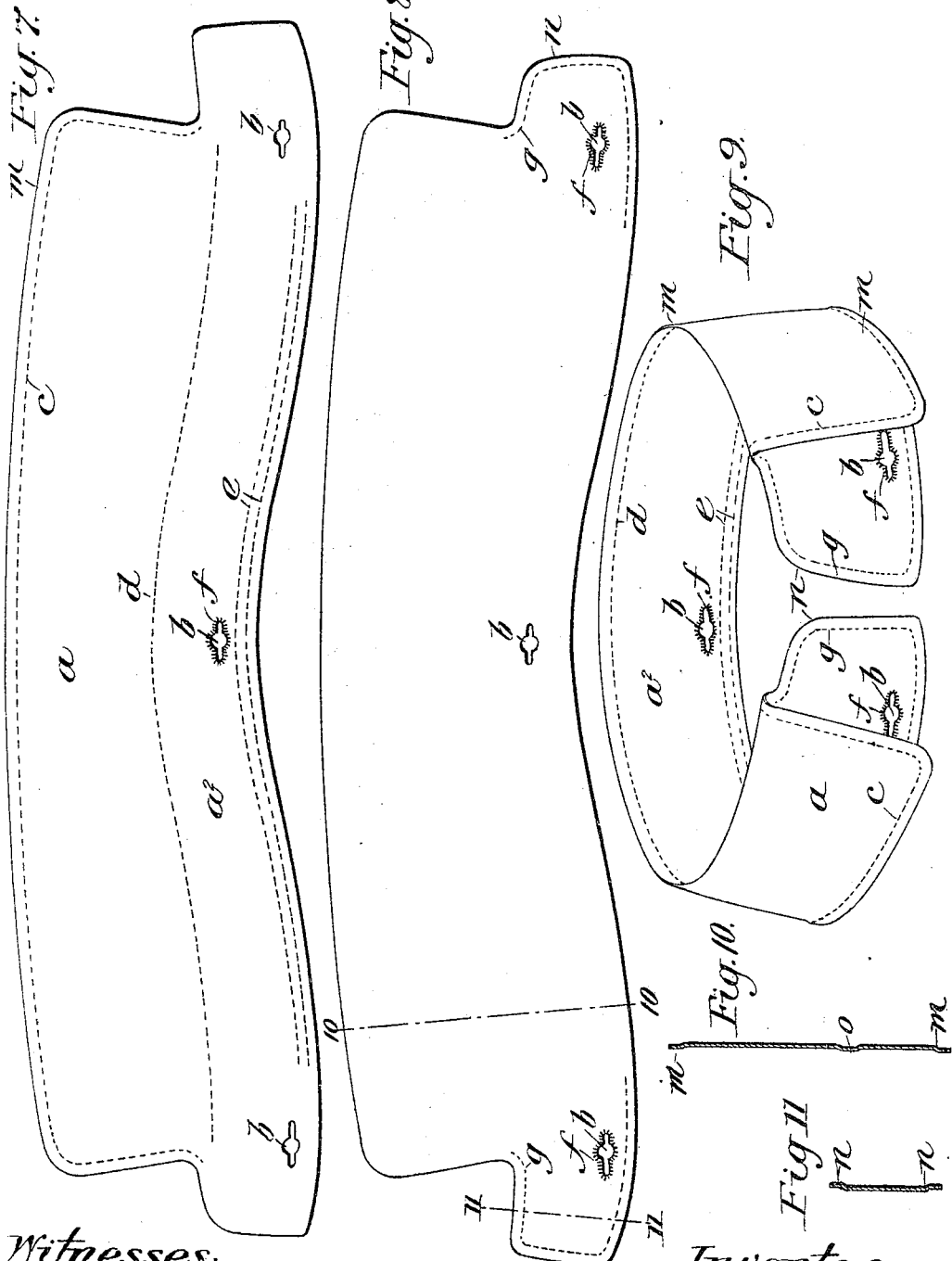

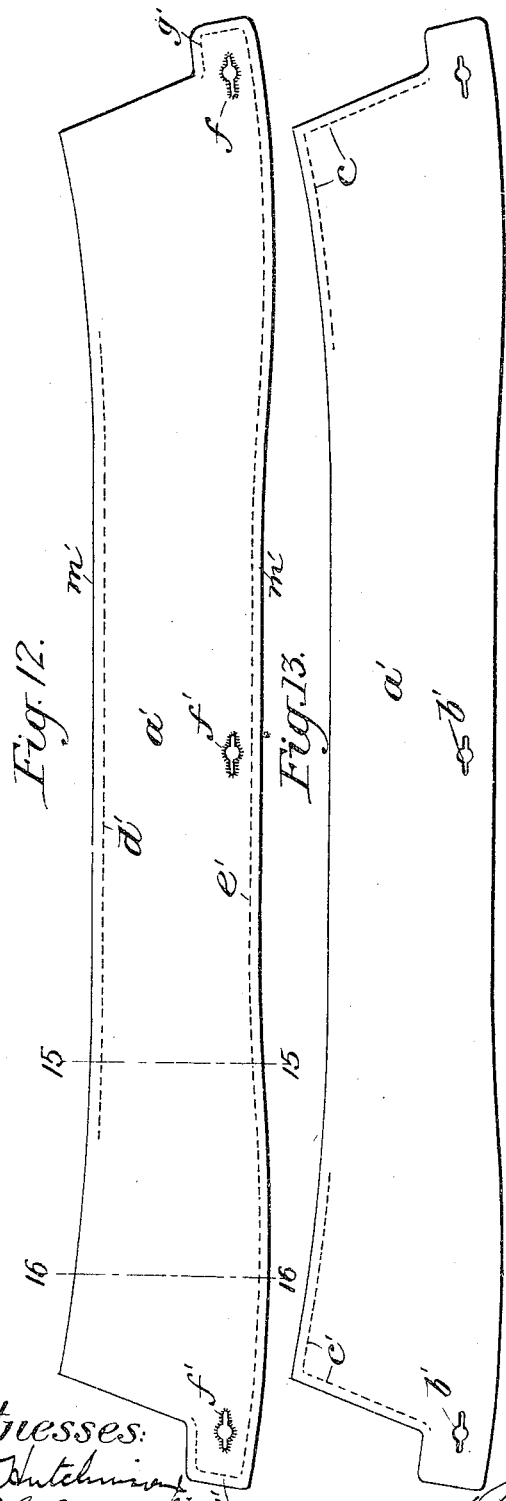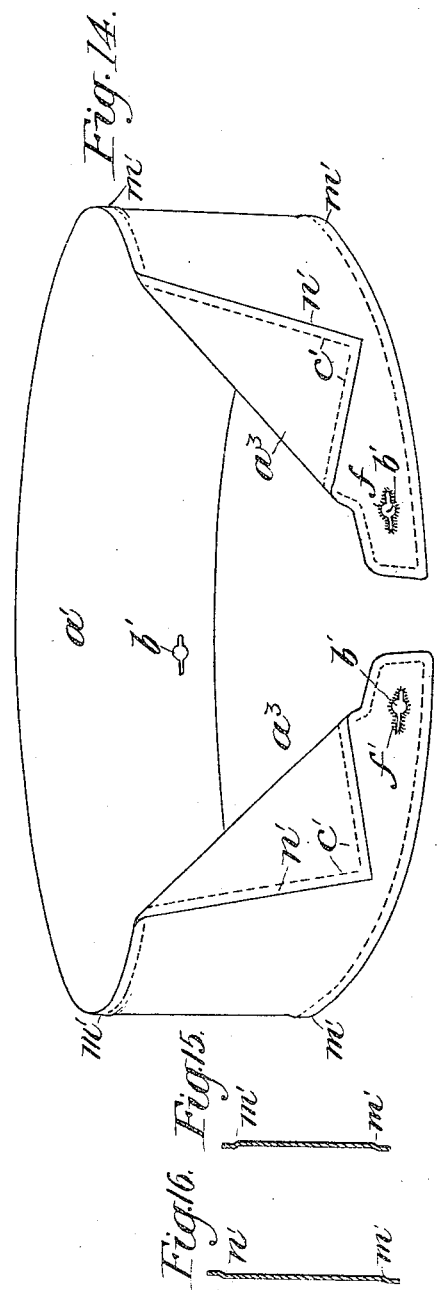

UNITED STATES PATENT OFFICE.

JAMES A. OSBORNE, OF ARLINGTON, NEW JERSEY, ASSIGNOR TO ARLINGTON COMPANY, OF ARLINGTON, NEW JERSEY, A CORPORATION OF NEW JERSEY.

APPARATUS FOR MAKING PYROXYLIN COLLARS, CUFFS, AND THE LIKE.

No. 808,473.

Specification of Letters Patent.

Patented Dec. 26, 1905.

Application filed May 1, 1905. Serial No. 258,424.

*To all whom it may concern:*

Be it known that I, JAMES A. OSBORNE, a citizen of the United States, residing at Arlington, county of Hudson, State of New Jersey, have invented certain new and useful Improvements in Apparatus for Making Pyroxylin Collars, Cuffs, and the Like; and I do hereby declare the following to be a full, clear, and exact description of the invention, such as will enable others skilled in the art to which it appertains to make and use the same.

My invention relates to mechanism employed in the manufacture of collars, cuffs, and the like from pyroxylin or similar plastic compositions, and is particularly designed to produce pyroxylin collars and cuffs simulating textile-fabric articles of the same character in all essential details.

To this end the invention comprises a novel die or former in which blank sheets of pyroxylin cut to suitable pattern for making collars or cuffs have imparted to them a surface simulating textile fabric. The marginal edges are offset or deflected to represent hemming, and said marginal edges, as well as the edges of the buttonholes, are provided with impressions representing stitching, so that the finished article bears such close resemblance to its textile fabric prototype as to be practically indistinguishable therefrom when in use.

Referring to the accompanying drawings, Figure 1 represents in perspective and partially in section a preferred form of apparatus comprising a die or former employed in the practice of my invention, showing a blank for a turned-down or roll collar in proper position in the former. Fig. 2 is a transverse sectional view of the apparatus. Fig. 3 shows a die or former in open position. Fig. 4 is a similar view showing the lower die-section opened up to illustrate the mold-plate underlying the textile material. Figs. 5 and 6 are views corresponding to Figs. 3 and 4, illustrating a similar apparatus designed to operate upon standing collars. Figs. 7 and 8 are front and rear elevations of a blank for a roll-collar as it comes from the die or former. Fig. 9 is a perspective view of the finished article. Figs. 10 and 11 are sections on the lines 10 10 and 11 11 of Fig. 8, showing the offset or deflected marginal edges of the collar. Figs. 12 to 16, inclusive, are views of a standing collar corresponding to the views of the roll-collar illustrated in Figs. 7 to 11, inclusive.

The purpose of the invention is to produce a collar or cuff simulating the textile-fabric article of the same kind in all essential details, and to this end the apparatus produces an article of the character above described in which the exposed surfaces simulate the usual linen surfaces and the collar or cuff is provided with impressions formed in the body of the material representing hemming, edge-stitching, and buttonhole-stitching in the same location as the actual hemming and stitching of the ordinary fabric article of the same kind.

In Figs. 7 to 15, inclusive, are shown collars formed from a single blank of pyroxylin or similar material by my improved apparatus, Figs. 7 to 10 showing a roll-collar, and Figs. 12 to 15 a standing collar. The roll-collar comprises the body portion $a$, forming the outside of the collar and overlying the inside section $a^2$, which latter is provided with the usual fastening-tabs and buttonholes. The marginal edges of the portion $a$ are provided with offsets or forwardly-deflected portions $m$, which represent the usual thickened edges of the fabric collars produced by the doubling of the numerous plies to form the hems. The inner section is provided around the marginal edges of the tabs with reverse offsets or deflected portions $n$, which when the collar is folded represent the hems formed upon said tabs, a medial offset $o$ being provided longitudinally of the blank to afford an easy bend between the inside and outside portions of the collar. All the marginal edges of the collar which are exposed are provided with impressions which closely resemble the stitching by means of which the component parts of the ordinary fabric collar are secured together. Thus the said blank has a row of impressions $c$ around its entire outer surface, a double row of impressions $e$ around the lower edge of its inside surface, and a single row $d$ along the upper edge of the inside surface of the collar, while the tabs each have a row of impressions $g$ along their outer edges. The buttonholes $b$ are each provided with a series of impressions extending normal to the edges thereof to represent buttonhole-stitching. It is essential that only those portions of the buttonhole which are exposed should be provided with this simulation of buttonhole-stitching. In the standing collar represented in Figs. 12 to 15 the same general rule is followed in that the front and rear faces of the body $a'$ are both provided with surfaces to represent textile fabric. The upper and lower marginal edges are offset, as at $m'$ and $n'$, to represent hemming, and the buttonholes are provided with simulation buttonhole-stitching $f'$. It is to be understood, of course, that in producing cuffs by my improved mode of operation the same general principles are to be followed, whereby all of the exposed surfaces are suitably impressed to represent linen and the marginal edges are offset to simulate hemming and stitching, respectively, and the buttonholes provided with impressions normal to the edges thereof representing buttonhole-stitching.

For the practice of my invention I provide a die or former adapted to receive the blank, which latter is formed, preferably, of a single sheet of pyroxylin cut to pattern to form the collar or cuff of the particular shape desired. The die or former is illustrated in Figs. 1 to 6, inclusive, and is constructed substantially as follows: A series of layers of textile fabric 1 is united to a similar series of layers 2 along one of the longitudinal edges, preferably by means of suitable stitching 3, so that the two series when folded together register with each other and form a substantially book-like structure capable of being opened and closed. The layers or plies of each series are joined together along their marginal edges by lacings 5, passed through suitable registering holes 4, so that when the upper series is folded down upon the lower series the several plies in both series register accurately throughout. Underlying the lower series of plies 2 and preferably intermediate said plies is located a plate or mold 6, preferably of pasteboard, having the outline of a collar or cuff and provided with suitable offsets in the form of depressions 8 8' and elevations 9 corresponding to the offsets or deflected portions $m\ m'\ n\ n'$ of the finished collars. The plate is also provided with orifices 20, corresponding to the buttonholes in the finished article. The inner layer or ply of each of the series 1 and 2 is provided with rows of stitching 10, 10', and 11, which when the sections are folded together overlie and register with the plate 6, the stitching 10 10' being on the lower half of the die or former and the stitching 11 on the upper half, as shown in Figs. 1, 3, and 5. The inner plies of the respective series above referred to are also provided with outline representations of buttonholes 12 done in buttonhole-stitching. Secured to the inner ply of the lower series in proper position to hold the blank in accurate registry with the plate 6 there is a series of guides, each of which comprises a base 15, secured to the fabric base, preferably by glue or other adhesive, and a T-shaped metal piece having spring-prongs 16, which latter normally project upward from the surface and are adapted to be forced down flush therewith when the two sections of the die or former are folded together.

In operating my invention the pyroxylin blank, which, as before stated, is cut to suitable pattern, is placed on the inner ply of the lower die or former section so that it rests snugly between the various guides 16 and is thereby held in exact registry with the plate or mold 6, as illustrated in Figs. 1 and 2. The upper portion of the die or former is then folded down upon the lower and the whole apparatus is placed in a heating-press of the kind usually employed in the manufacture of articles of pyroxylin or similar material. Under the influence of the heat and pressure the pyroxylin blank is softened and gradually takes the impression of the fabric forming the inner plies of the die or former sections, which produces on both sides of said blank an impressed surface closely resembling that of the textile fabric itself. The stitching 10, 10', and 11, which project from the fabric face of the respective former-sections, is likewise forced into the soft pyroxylin as are the stitches 12 outlining the buttonholes. The pliability of the textile layers in the section 2 causes the soft pyroxylin to follow the depressions and elevations in the plate or mold 6, so that the edges of the blank are offset or deflected. After the die or former (together with the inclosed pyroxylin blank) has been subjected to the desired heat for a sufficient time it is withdrawn and the blank is removed and allowed to cool, so that all of the impressions imparted to said blank by the former are permanently set. The blank is then ready to be bent or folded into its final shape, and when finished the article resembles a textile-fabric structure of the same kind so closely as to withstand close scrutiny when in use.

What I claim is—

1. A die or former for pyroxylin collars or cuffs, comprising layers or plies of textile fabric, and means for holding the same together in alinement or registry.

2. A die or former for pyroxylin collars or cuffs, comprising layers or plies of textile fabric, and means along one edge to hold the plies in alinement or registry.

3. A die or former for pyroxylin collars or cuffs, comprising a series of layers or plies of textile fabric united by stitching along one edge.

4. A die or former for pyroxylin collars or cuffs, comprising two series of layers or plies of textile fabric, the whole united along one edge, and means for securing the layers or plies together along their respective edges.

5. A die or former for pyroxylin collars or cuffs, comprising two series of layers or plies of textile fabric, the whole united along one edge, and lacing for securing the layers or plies together along their respective edges.

6. A die or former for pyroxylin collars or cuffs, comprising two series of layers or plies of textile fabric, and a plate having the outline of a collar or cuff underlying the layers or plies of one series.

7. A die or former for pyroxylin collars or cuffs, comprising two series of layers or plies of textile fabric united along one edge, and a plate having the outline of a collar or cuff underlying the layers or plies of one series.

8. A die or former for pyroxylin collars or cuffs, comprising two series of layers or plies of textile fabric, and a plate having the outline of a collar or cuff interposed between the layers or plies of one series, said plate having offset or deflected edges.

9. A die or former for pyroxylin collars or cuffs, comprising two series of layers or plies of textile fabric, united along one edge, and rows of stitching on the contiguous fabric layers of the two series.

10. A die or former for pyroxylin collars or cuffs, comprising two series of layers or plies of textile fabric united along one edge, rows of stitching outlining the collar or cuff on the contiguous fabric layers of the two series, and stitching outlining buttonholes on one or both of said contiguous layers.

11. A die or former for pyroxylin collars or cuffs, comprising two series of layers or plies of textile fabric united along one edge, a plate having the outline of a collar or cuff and having offset or deflected edges interposed between the layers or plies of one series, and rows of stitching on the contiguous layers of the two series adapted to overlie the offset edges of said plate when the two series are folded together.

12. A die or former for pyroxylin collars or cuffs, comprising two series of layers or plies of textile fabric united along one edge, a plate having the outline of a collar or cuff and having offset or deflected edges interposed between the layers or plies of one series, rows of stitching on the contiguous layers of the two series adapted to overlie the offset edges of said plate when the two series are folded together, and stitching on one or both of said contiguous layers outlining the buttonholes in the collar or cuff.

13. A die or former for pyroxylin collars or cuffs, comprising two series of layers or plies of textile fabric, the series being united along one edge, lacing securing the several layers of each series together along one edge, a plate having the outline of a collar or cuff and having offset or deflected edges interposed between the layers or plies of one series, and rows of stitching on the contiguous layers of the two series adapted to overlie the offset edges of said plate when the two series are folded together.

14. A die or former for pyroxylin collars or cuffs, comprising two series of layers or plies of textile fabric, the series being united along one edge, lacing securing the several layers of each series together along one edge, a plate having the outline of a collar or cuff and having offset or deflected edges interposed between the layers or plies of one series, rows of stitching on the contiguous layers of the two series adapted to overlie the offset edges of said plate when the two series are folded together, and stitching on one or both of said contiguous layers outlining the buttonholes in the collar or cuff.

15. A die or former for pyroxylin collars or cuffs, comprising two series of layers or plies of textile fabric united along one edge, a plate having the outline of a collar or cuff interposed between the layers of one series, and guides secured to the face of one of said series for holding the collar or cuff blank in registry with said plate.

16. A die or former for pyroxylin collars or cuffs, comprising two series of layers or plies of textile fabric united along one edge, a plate having the outline of a collar or cuff interposed between the layers of one series, and guides secured to the face of one of said series for holding the collar or cuff blank in registry with said plate, each of said guides comprising a base secured to the fabric face and spring-prongs attached to said base.

17. A die or former for pyroxylin collars or cuffs, said die having an impression-surface of textile fabric, provided with raised stitching.

18. A die or former for pyroxylin collars or cuffs, said die having an impression-surface of textile fabric, provided with raised stitching, and having an underlying, shaping or forming mold.

In testimony whereof I affix my signature in presence of two witnesses.

JAMES A. OSBORNE.

Witnesses:
GEORGE H. SONNEBORN,
FREDERICK H. DAVIS.